(12) United States Patent
Suzuki et al.

(10) Patent No.: US 9,093,672 B2
(45) Date of Patent: Jul. 28, 2015

(54) TITANIUM FUEL CELL SEPARATOR

(75) Inventors: Jun Suzuki, Kobe (JP); Toshiki Sato, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/811,098

(22) PCT Filed: Sep. 1, 2010

(86) PCT No.: PCT/JP2010/064946
§ 371 (c)(1),
(2), (4) Date: Jan. 18, 2013

(87) PCT Pub. No.: WO2012/011201
PCT Pub. Date: Jan. 26, 2012

(65) Prior Publication Data
US 2013/0164654 A1      Jun. 27, 2013

(30) Foreign Application Priority Data
Jul. 20, 2010 (JP) ................................. 2010-163404

(51) Int. Cl.
H01M 8/02 (2006.01)

(52) U.S. Cl.
CPC .......... *H01M 8/0228* (2013.01); *H01M 8/0206* (2013.01); *H01M 8/0208* (2013.01); *Y02E 60/50* (2013.01)

(58) Field of Classification Search
CPC ............ H01M 8/0202; H01M 8/0206; H01M 8/0208; H01M 8/0228; Y02E 60/50
See application file for complete search history.

(56) References Cited

U.S. PATENT DOCUMENTS

| | | | |
|---|---|---|---|
| 6,440,598 B1 | 8/2002 | Fukui et al. | |
| 6,761,990 B1 * | 7/2004 | Yoshitake et al. | 429/454 |
| 2002/0093783 A1 * | 7/2002 | Bendale et al. | 361/502 |
| 2004/0170881 A1 * | 9/2004 | Nakata | 429/34 |
| 2007/0243429 A1 * | 10/2007 | Uchiyama et al. | 429/18 |
| 2008/0160390 A1 | 7/2008 | Nakata | |
| 2009/0211667 A1 | 8/2009 | Suzuki et al. | |
| 2009/0226787 A1 * | 9/2009 | Tanaka et al. | 429/30 |
| 2010/0035120 A1 | 2/2010 | Sato et al. | |
| 2010/0151358 A1 | 6/2010 | Sato et al. | |

FOREIGN PATENT DOCUMENTS

| | | |
|---|---|---|
| CN | 101617428 A | 12/2009 |
| EP | 2 597 711 A1 | 5/2013 |
| JP | 10 255823 | 9/1998 |

(Continued)

OTHER PUBLICATIONS

English Machine translation of Matsuno JP2001-283872, Oct. 2001.* Japanese Office Action Issued Nov. 30, 2010 in JP Patent Application No. 2010-163404 Filed Jul. 20, 2010 (with English translation).
U.S. Appl. No. 13/811,118, filed Jan. 18, 2013, Suzuki, et al.

(Continued)

*Primary Examiner* — Ula C Ruddock
*Assistant Examiner* — Lisa S Park Gehrke
(74) *Attorney, Agent, or Firm* — Oblon, McClelland, Maier & Neustadt, L.L.P.

(57) ABSTRACT

Disclosed is a titanium fuel cell separator having excellent conductivity and durability. In the disclosed titanium fuel cell separator (10), a carbon layer (2) is formed on the surface of a substrate (1) formed from pure titanium or a titanium alloy. An intermediate layer (3) is formed on the interface between the substrate (1) and the carbon layer (2). The intermediary layer (3) has lined-up granular titanium-carbide in the direction parallel to the carbon layer (2).

4 Claims, 3 Drawing Sheets

(56) References Cited

FOREIGN PATENT DOCUMENTS

| JP | 2001 283872 | 10/2001 |
|----|-------------|---------|
| JP | 2006-140095 | 6/2006 |
| JP | 3904690 | 4/2007 |
| JP | 3904696 | 4/2007 |
| JP | 2007 207718 | 8/2007 |
| JP | 2008 204876 | 9/2008 |
| JP | 4147925 | 9/2008 |

OTHER PUBLICATIONS

Written Opinion of the International Searching Authority Issued Nov. 30, 2010 in PCT/JP10/064946 Filed Sep. 1, 2010.

International Search Report Issued Nov. 30, 2010 in PCT/JP10/064946 Filed Sep. 1, 2010.

M.L. Perry, et al., "A Historical Perspective of Fuel Cell Technology in the 20$^{th}$ Century", Journal of the Electrochemical Society 149, 7, 2002, 8 pages.

* cited by examiner (a)

(b)

TITANIUM FUEL CELL SEPARATOR

CROSS-REFERENCE TO RELATED APPLICATIONS

This application is a National Stage of PCT/JP2010/064946 filed Sep. 1, 2010. This application is based upon and claims the benefit of priority from Japanese Patent Application No. 2010-163404 filed Jul. 20, 2010, the entire contents of which are incorporated herein by reference.

TECHNICAL FIELD

The present invention relates to titanium fuel cell separators for use in fuel cells.

BACKGROUND ART

Fuel cells are capable of continuously generating electric power through continuous supply of a fuel (e.g., hydrogen) and an oxidizing agent (e.g., oxygen). Unlike primary batteries (such as dry batteries) and secondary batteries (such as lead storage batteries), the fuel cells generate electric power at a high power generating efficiency without being significantly affected by the scale of an electric-power-using system and do not generate much noise and vibrations. The fuel cells are therefore expected to be used as energy sources covering a wide variety of uses and scales. Specifically, the fuel cells have been developed as polymer electrolyte fuel cells (PEFCs), alkaline fuel cells (AFCs), phosphoric acid fuel cells (PAFCs), molten carbonate fuel cells (MCFCs), solid oxide fuel cells (SOFCs), and biofuel cells. Among them, polymer electrolyte fuel cells have been developed for use in fuel cell powered vehicles, domestic use fuel cells (domestic use co-generation systems), and mobile devices such as cellular phones and personal computers.

Such a polymer electrolyte fuel cell (hereinafter simply referred to as a "fuel cell") includes a stack of plural single cells, in which each single cell includes an anode, a cathode, and a polymer electrolyte membrane arranged between the anode and the cathode through the medium of electrodes called separators (also called bipolar plates). The separators have grooves acting as channels for a gas (e.g., hydrogen or oxygen). The fuel cell may exhibit an increasing output by increasing the number of cells per stack.

The separators for fuel cells (fuel cell separators) also act as parts for recovering a generated current to outside of the fuel cell. Materials for separators have to maintain a low contact resistance over a long duration during use as separators. The contact resistance is a resistance which causes voltage drop due to an interfacial phenomenon between the electrode and the separator surface. The separators also should have satisfactory corrosion resistance, because the inside of fuel cells is an acidic atmosphere.

To meet these requirements, separators milled from molded articles of graphite powders, and separators molded from a mixture of graphite and a resin have been proposed. These separators, however, have inferior strengths and toughness and may be broken upon application of vibration or impact, although they have satisfactory corrosion resistance. To avoid these disadvantages, various types of separators prepared from metallic materials have been proposed.

Exemplary metallic materials having both corrosion resistance and conductivity include gold (Au) and platinum (Pt). Specifically, customarily-studied techniques employ a metallic substrate made from a metallic material capable of having a small thickness and exhibiting satisfactory workability and high strengths, such as an aluminum alloy, stainless steel, nickel alloy, or titanium alloy, in which the metallic substrate is coated with a noble metal such as Au or Pt to give separators having both corrosion resistance and conductivity. The noble metal materials are, however, very expensive and cause higher cost.

As a possible solution to these issues, metallic separators without using noble metal materials have been proposed.

Typically, exemplary proposed separators include a separator including a substrate and a carbon film formed on a surface of the substrate by vapor deposition (see Patent Literature (PTL) 1); and a separator including a stainless steel substrate and graphite compression-bonded on a surface of the substrate (see PTL 2 and PTL 3).

Exemplary proposed separators further include a separator including a metallic substrate and, formed on a surface thereof, a carbon layer having a G/D ratio of 0.5 or less as measured by Raman spectroscopy (see PTL 4); and a separator including a metallic substrate and, formed on a surface thereof, a carbon layer including an amorphous carbon layer and a graphite region (see PTL 5).

CITATION LIST

Patent Literature

PTL 1: Japanese Patent No. 4147925
PTL 2: Japanese Patent No. 3904690
PTL 3: Japanese Patent No. 3904696
PTL 4: Japanese Unexamined Patent Application Publication (JP-A) No. 2007-207718
PTL 5: JP-A No. 2008-204876

SUMMARY OF INVENTION

Technical Problem

The techniques disclosed in PTL 1, 4, and 5, however, employ an amorphous carbon layer formed on a surface of a metallic substrate, may thereby suffer from insufficient environmental shielding properties (barrier properties), and often undergo oxidation and other reactions on the surface of the metallic substrate, which reactions cause decrease in conductivity. The separators according to the techniques disclosed in PTL 1, 4, and 5 may therefore have inferior conductivity and poor conductive durability. As used herein the term "conductive durability" refers to such a property as to maintain electrical conductivity over a long duration.

The techniques disclosed in PTL 2 and 3 employ a stainless steel substrate in the separators and may suffer from deterioration of the polymer electrolyte membrane due to dissolution of iron ions from the stainless steel substrate during usage. The carbon layer in the techniques disclosed in PTL 2 and 3 contains carbon in a low content, and the separators thereby have a large region from which the stainless steel substrate exposed. The separators thereby often suffer from the dissolution of iron ions and oxidation of the substrate surface and may undergo decrease in conductivity.

The present invention has been made under these circumstances, and an object thereof is to provide a titanium fuel cell separator which has superior conductivity and satisfactory durability.

Solution to Problem

The present inventors have employed pure titanium or a titanium alloy as a substrate, because of having superior corrosion resistance; and have found that a reaction between the substrate and a carbon layer formed on a surface of the substrate gives an intermediate layer at the interface between the substrate and the carbon layer, which intermediate layer contains granular titanium carbide; and that the presence of the intermediate layer helps the separator to have both superior conductivity and satisfactory durability. The present invention has been made based on these findings.

To achieve the object, the present invention provides a titanium fuel cell separator which includes a substrate consisting of pure titanium or a titanium alloy; a carbon layer formed on a surface of the substrate; and an intermediate layer formed at an interface between the substrate and the carbon layer, in which the intermediate layer contains titanium carbide in a form of grains ranging in a direction parallel to the carbon layer.

The titanium fuel cell separator according to the present invention employs pure titanium or a titanium alloy to constitute the substrate and can thereby have a smaller weight and better corrosion resistance. The employment of pure titanium or a titanium alloy as the substrate prevents dissolution of metal ions from the separator and avoids deterioration of the polymer electrolyte membrane, and also contributes to improvements in strengths and toughness of the substrate.

The titanium fuel cell separator according to the present invention has an intermediate layer including conductive titanium carbide, thereby has a smaller electric resistance at the interface between the substrate and the carbon layer, and can exhibit better conductivity.

In addition, the titanium carbide is formed through a reaction between the substrate and the carbon layer and helps the substrate and the carbon layer to have better adhesion to each other.

The titanium carbide also helps the carbon layer to be in intimate contact with the substrate surface over a long duration and thereby helps the separator to have better conductive durability (such a property as to maintain conductivity over a long duration).

The carbon layer in the titanium fuel cell separator according to the present invention preferably contains graphite.

Graphite has satisfactory conductivity and exhibits superior durability in an acidic atmosphere. The separator, when the substrate surface is covered with carbon in a graphite structure in an area percentage at a certain level or higher, has better environmental shielding properties and less suffers from oxidation and other reactions at the interface between the substrate and the carbon layer, which reactions cause decrease in conductivity. The environmental shielding properties are properties that protect the substrate from the environment inside cells of the fuel cell. The presence of graphite in the carbon layer may help the titanium fuel cell separator according to the present invention to have better conductivity and conductive durability.

The titanium carbide grains constituting the intermediate layer in the titanium fuel cell separator according to the present invention preferably have an average size of 5 nm or more.

The titanium carbide grains constituting the intermediate layer, when having an average size of 5 nm or more as above, may help the carbon layer to be resistant to separation from the substrate and may contribute to sufficient adhesion between the substrate and the carbon layer.

Advantageous Effects of Invention

The titanium fuel cell separator according to the present invention, as having an intermediate layer including conductive titanium carbide, can have better conductivity, better durability, and higher adhesion.

The titanium fuel cell separator according to the present invention, when containing graphite in the carbon layer, may have further better conductivity and durability.

In addition, the titanium fuel cell separator according to the present invention, when having an average size of the titanium carbide grains constituting the intermediate layer of 5 nm or more, may have satisfactory adhesion between the substrate and the carbon layer.

DESCRIPTION OF EMBODIMENTS

Embodiments of the titanium fuel cell separator according to the present invention will be illustrated in detail with reference to the attached drawings according to necessity.

Titanium Fuel Cell Separator

Figure 1:
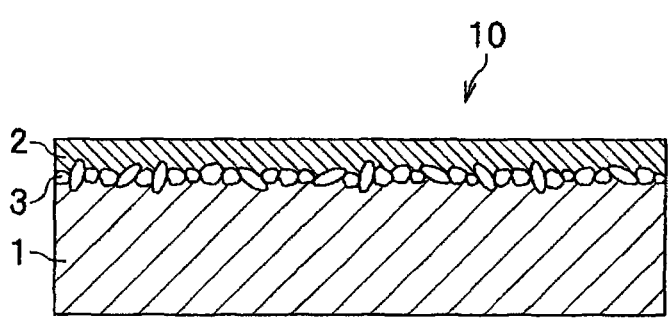
FIG. 1 depicts cross-sectional views schematically illustrating titanium fuel cell separators according to embodiments, in which view (a) is a cross-sectional view of a titanium fuel cell separator including a substrate and, formed on one side thereof, a carbon layer and an intermediate layer; and view (b) is a cross-sectional view of a titanium fuel cell separator including a substrate and, respectively formed on both sides thereof, carbon layers and intermediate layers.
Figure 1:
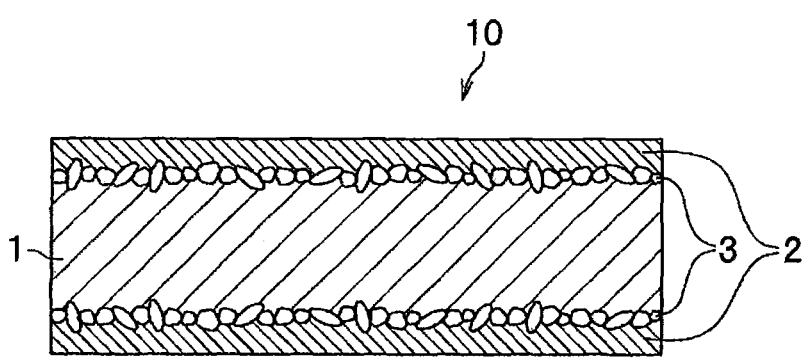

A titanium fuel cell separator 10 (hereinafter also appropriately referred to as a "separator") according to an embodiment includes a substrate 1, a carbon layer 2 formed on a surface (on one side or both sides) of the substrate 1, and an intermediate layer 3 formed at the interface between the substrate 1 and the carbon layer 2, as illustrated in FIG. 1, views (a) and (b).

The substrate 1, the carbon layer 2, the intermediate layer 3, and manufacturing methods of the separator 10 will be illustrated in detail below.

Substrate

The substrate 1 in the separator 10 includes pure titanium or a titanium alloy. The substrate 1 therefore has a lighter weight and exhibits more satisfactory corrosion resistance than a substrate typically using a stainless steel. The substrate 1, if having a region or edge exposed without being covered with the carbon layer 2 (or with the carbon layer 2 and the intermediate layer 3), is protected from dissolution (deterioration) without danger of metal dissolution, because such exposed region or edge in the environment inside cells of the fuel cell is coated with a passive film formed on its surface. In addition, satisfactory strengths and toughness of pure titanium or a titanium alloy constituting the substrate helps the substrate 1 to have satisfactory strengths and toughness.

The substrate 1 may be prepared by a known process such as a process of melting and casting pure titanium or a titanium alloy to give an ingot, sequentially followed by hot rolling and cold rolling. The substrate 1 preferably undergoes annealed finish, but the substrate 1 may be finished in any form such as "annealed and pickled finish," "vacuum heat treatment finish," and "bright annealed finish."

The titanium material constituting the substrate 1 may have any chemical composition not limited. However, for easy cold rolling and better performance in subsequent stamping, preferred is a titanium material including oxygen (O) in a content of 1500 ppm or less (more preferably 1000 ppm or less), iron (Fe) in a content of 1500 ppm or less (more preferably 1000 ppm or less), carbon (C) in a content of 800 ppm or less, nitrogen (N) in a content of 300 ppm or less, and hydrogen (H) in a content of 130 ppm or less, with the remainder including titanium (Ti) and inevitable impurities. For example, a cold-rolled sheet of pure titanium according to Japanese Industrial Standards (JIS) Class 1 may be used as the substrate 1.

The substrate 1 has a thickness of preferably 0.05 to 1.0 mm. The substrate 1, if having a thickness of less than 0.05 mm, may not sufficiently have required strengths; and in contrast, the substrate 1, if having a thickness of more than 1.0 mm, may have insufficient workability.

Carbon Layer

The carbon layer 2 in the separator 10 contains carbon having both conductivity and corrosion resistance. Carbon for use herein is not limited and may be amorphous carbon. The carbon layer 2, however, preferably contains crystalline graphite. The graphite, as having environmental shielding properties (properties for isolating the substrate 1 from the environment inside cells of the fuel cell), may impede occurrence of oxidation and other reactions at the interface between the substrate 1 and the carbon layer 2, which reactions will adversely affect the conductivity. Thus, the graphite may help the separator 10 to have higher conductivity and better conductive durability.

As used herein the term "graphite" refers to a carbonaceous hexagonal sheet-like crystal including a multiplicity of graphene sheets each having a hexagonal lattice, having a sheet-form, and being stacked and layered on one another.

The carbon layer 2 preferably covers the entire surface of the substrate 1, but does not always have to cover the entire surface. For conductivity and corrosion resistance at certain levels, the carbon layer 2 may cover 40% or more, preferably 50% or more, of the surface of the substrate 1. A passive film of titanium is formed in a region of the surface of the substrate 1 not covered with the carbon layer 2, and this contributes to the suppression of oxidation and other reactions on the substrate 1.

The carbon layer 2 may be formed by rolling a substrate 1 bearing a carbon powder adhered to its surface, whereas the formation process will be described in detail later.

The mass of coating of the carbon layer 2 on the surface of the substrate 1 affects the conductive durability (such a property as to maintain conductivity over a long duration). If the carbon layer 2 is present in a mass of coating of less than 2 $\mu g/cm^2$, the separator may not have sufficient environmental shielding properties because of a larger area of a region of the substrate 1 not covered with the carbon layer 2. As the result, the substrate 1 is oxidized in a larger area in the environment inside cells of the fuel cell and causes the fuel cell to have insufficient conductive durability. To avoid these, the carbon layer 2 is present in a mass of coating of preferably 2 $\mu g$ or more, and more preferably 5 $\mu g$ or more per square centimeter of the surface of the substrate 1.

Though upper limit in mass of coating is not critical, the carbon layer 2 is enough to be present in a mass of coating of 1000 $\mu g/cm^2$ or less, because the carbon layer 2, if present in a mass of coating of more than 1000 $\mu g/cm^2$, may not further contribute to improvements in conductive durability.

The amount (mass of coating) of carbon on the surface of the substrate 1 can be controlled by the amount of a carbon powder to be applied to the substrate 1 in a carbon powder coating step mentioned later.

Intermediate Layer

The separator includes an intermediate layer 3 at the interface between the substrate 1 and the carbon layer 2. The intermediate layer 3 contains granular titanium carbide (titanium carbide in the form of grains) formed as a result of a reaction between the substrate 1 and the carbon layer 2. The granular titanium carbide has conductivity, contributes to reduction in electric resistance at the interface between the substrate 1 and the carbon layer 2, and helps the separator 10 to have higher conductivity. In addition, the granular titanium carbide is formed as a result of a reaction between the substrate 1 and the carbon layer 2 and thereby contributes to better adhesion between the substrate 1 and the carbon layer 2.

As used herein the term "granular" (in the form of grains) refers to that the substance is present in the form typically of any of spheres, spheroidal solids, ellipsoids, and polyhedrons.

Figure 2:
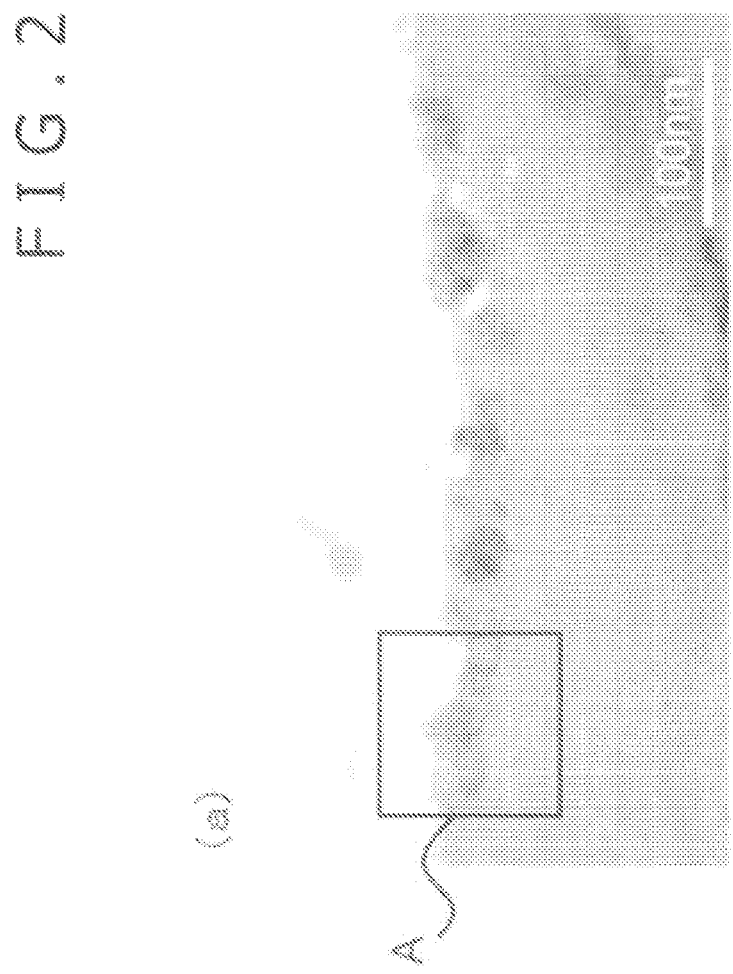
FIG. 2(a) depicts a referential diagram as a photograph of a cross section of a titanium fuel cell separator according to an embodiment, as observed with a transmission electron photomicrograph (TEM)
FIG. 2(b) is an enlarged view of Region A in FIG. 2(a).

The intermediate layer 3 is formed by irregular, ranging titanium carbide grains, as illustrated in FIG. 1, views (a) and (b). This is also demonstrated by the photograph (FIG. 2, views (a) and (b)) of the cross section of the separator 10 observed with a transmission electron microscope (TEM), indicating that the titanium carbide 3a is in the form of not a film but grains.

The intermediate layer 3 is preferably formed at the entire interface between the substrate 1 and the carbon layer 2, but may be formed in an area of 50% or more of the interface for ensuring adhesion between the substrate 1 and the carbon layer 2.

The titanium carbide grains have an average size (diameter) of preferably 5 nm or more. Titanium carbide grains having an average size of less than 5 nm may not contribute to sufficient adhesion between the substrate 1 and the carbon layer 2.

Though upper limit in average size is not critical, the titanium carbide grains are enough to have an average size of 100 nm or less, because the titanium carbide grains, if having an average size of more than 100 nm, may not further contribute to improvements in adhesion.

When a titanium carbide layer and a carbon layer are formed on a titanium substrate by vapor deposition, the formed titanium carbide layer has a uniform thickness. This results in formation of a distinct interface between the titanium carbide layer and the carbon layer, and the two layers may be separated from each other at the interface. By contrast, the titanium carbide layer in the present invention is a layer including irregular, raging grains of titanium carbide and has an uneven interface with the carbon layer. In addition to the formation of the titanium carbide layer as a result of a reaction between the carbon layer and titanium in the substrate, the uneven structure of the interface of the titanium carbide layer with the carbon layer may probably contributes to further better adhesion between the titanium substrate and the carbon layer.

The average size of grains of titanium carbide in the intermediate layer 3 can be measured by observing a cross section of the substrate 1 and the carbon layer 2 typically with a transmission electron microscope (TEM). As used herein the term "size (diameter)" of a titanium carbide grain, when being not spherical, refers to an arithmetic mean of a major axis and a minor axis of the grain. Also as used herein the term "average (grain) size" refers to an average of sizes of plural grains (e.g., 20 grains) of titanium carbide.

Next, a method for manufacturing the separator 10 will be illustrated.

Method for Manufacturing Separator

Initially, a carbon powder is applied to a surface (one side or both sides) of the substrate 1 (carbon powder coating step). The carbon powder may be applied according to any procedure not limited, but the carbon powder may be applied as intact as a powder directly to the substrate 1, or may be applied by dispersing the carbon powder in an aqueous solution typically of methylcellulose or in a coating material containing a resin component to give a slurry, and applying the slurry to the substrate 1.

The carbon powder to be applied to the surface of the substrate 1 may be a carbon powder having a particle size (diameter) of 0.5 to 100.0 μm. A carbon powder having a particle size of less than 0.5 μm may be pressed to the substrate 1 with insufficient force and may fail to be in intimate contact with the substrate 1 in a rolling step mentioned later. In contrast, a carbon powder having a particle size of more than 100.0 μm may not satisfactorily adhere to the surface of the substrate 1 in the carbon coating step and the rolling step.

The way to apply the carbon powder to the substrate 1 is not limited to the above process. Exemplary possible processes include a process of kneading a carbon powder with a resin to give a film containing the carbon powder, and applying the film to the substrate 1; a process of knocking a carbon powder into the surface of the substrate through shot blasting to allow the substrate 1 surface to bear the carbon powder; and a process of mixing a carbon powder with a resin powder to give a mixture, and applying the mixture to the substrate 1 through cold spraying.

Figure 4:
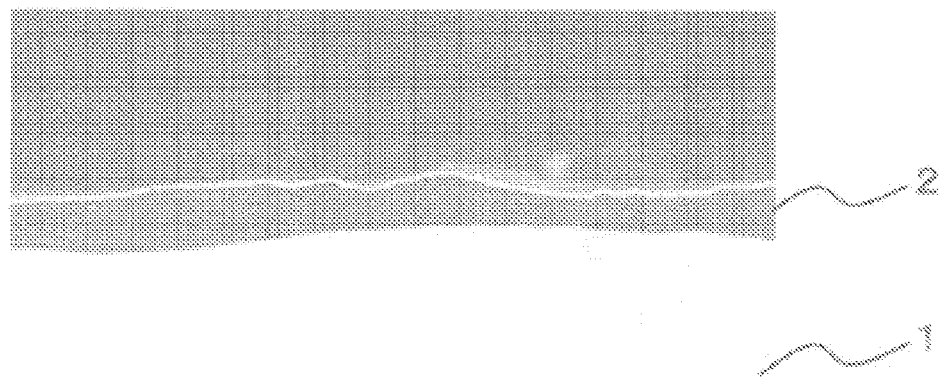
FIG. 4 is a referential drawing as a photograph of a cross section of a substrate and a carbon layer after coating the substrate with a carbon powder and subsequent rolling, as observed with a scanning electron microscope (SEM).

After the carbon powder coating step, the work is cold-rolled for compression bonding of the carbon powder to the substrate 1 (cold rolling step). By passing through the cold rolling step, the carbon powder is pressed and bonded as the carbon layer 2 to the surface of the substrate 1. The carbon powder adhered to the surface of the substrate 1 acts also as a lubricant, and this eliminates the need of using a lubricant upon cold rolling. After rolling, the carbon powder is not in the form of particles but in the form of a thin layer adhered to the substrate 1 so as to cover the substrate 1 on its surface (see the scanning electron photomicrograph (SEM) in FIG. 4).

Rolling in the cold rolling step is preferably performed to a total rolling reduction of 1% or more so as to compress and bond the carbon layer 2 to the substrate 1 with satisfactory adhesion.

The term "rolling reduction" refers to a value calculated from a change in thickness between before and after cold rolling and is calculated according to the following expression:

Rolling reduction=$(t0-t1)/t0 \times 100$ wherein t0 represents the initial thickness after the carbon powder coating step; and t1 represents the thickness after the rolling.

The work after the cold rolling step is subjected to a heat treatment in a non-oxidative atmosphere (heat treatment step). This step is performed to induce a reaction between the substrate 1 and the carbon layer 2 to thereby form an intermediate layer 3 at the interface between the substrate 1 and the carbon layer 2, which intermediate layer 3 contains granular titanium carbide. The heat treatment is preferably performed at a temperature in the range of 300° C. to 850° C. A heat treatment at a temperature of lower than 300° C. may cause the reaction between carbon and titanium to proceed slowly to cause inferior productivity. This is because it takes much time to form granular titanium carbide. In contrast, a heat treatment at a temperature of higher than 850° C. may cause phase transformation of titanium to thereby cause change in mechanical properties. The heat treatment may be performed for a duration of 0.5 to 60 minutes. The heat treatment time is preferably suitably controlled depending on the temperature such that the heat treatment is performed for a long time at a low temperature; and is performed for a short time at a high temperature.

As used herein the term "non-oxidative atmosphere" refers to an atmosphere having a low partial pressure of oxidative gas, such as an atmosphere having an oxygen partial pressure of $1.3 \times 10^{-3}$ Pa or lower.

The manufacturing method may further include a drying step between the carbon powder coating step and the cold rolling step. In the drying step, the substrate 1 bearing the carbon powder adhered to its surface is dried typically by blowing.

Examples

The titanium fuel cell separator according to the present invention will be illustrated in detail below, with reference to examples satisfying conditions specified in the present invention, and comparative examples not satisfying the conditions.

Specimen Preparation

Pure titanium of JIS Class 1, which had undergone annealed and picked finish, was used as a substrate. The pure titanium had a chemical composition including oxygen (O) in a content of 450 ppm, iron (Fe) in a content of 250 ppm, and nitrogen (N) in a content of 40 ppm and further including titanium and inevitable impurities. The titanium substrate had a thickness of 0.5 mm. A carbon powder having an average particle size of 10 μm and four-nines purity was used. The titanium substrate was obtained by subjecting a titanium material sequentially to a melting step, casting step, hot rolling step, and cold rolling step according to known procedures.

The carbon powder was dispersed to a predetermined concentration in a 1 percent by weight aqueous methylcellulose solution to give a slurry. The slurry was applied to both sides of the titanium substrate, followed by air drying.

A roll-to-roll gap was adjusted so as to allow a rolling reduction per one pass to be a predetermined value, and cold rolling was performed in two or more passes to a predetermined total rolling reduction. Reduction rolls used herein were not coated with a lubricating oil.

Next, a heat treatment was performed at a predetermined temperature in a non-oxidative atmosphere (at an oxygen partial pressure of $1.3 \times 10^{-3}$ Pa) for a predetermined time and thereby yielded specimens. Some specimens did not undergo the heat treatment.

The prepared specimens were subjected to determination of an intermediate layer, measurement of coating mass of carbon, evaluation of carbon layer adhesion, evaluation of contact resistance, and evaluation of durability according to the following methods.

[Intermediate Layer Determination]

A cross section of a specimen surface layer was processed with an ion beam processing instrument (Hitachi Focused Ion Beam System FB-2100) to give a sample, and the sample cross section was observed at a 750000-fold magnification with a transmission electron microscope (TEM: Hitachi Field Emission Analytical Electron Microscope HF-2200) to determine whether titanium carbide was present at the interface between the carbon layer and the titanium substrate. When titanium carbide was present, an average grain size thereof was measured. As used herein the term "size (diameter)" of a titanium carbide grain, when being not spherical, refers to an arithmetic mean of a major axis and a minor axis of the grain. Also as used herein the term "average (grain) size" refers to an average of sizes of twenty grains of titanium carbide.

[Measurement of Coating Mass of Carbon]

A test specimen having a predetermined size was cut from each of the above-prepared specimens and weighed. The test specimen was subjected to ultrasonic cleaning with pure water to remove the carbon layer therefrom. The test specimen after removal of the carbon layer was dried and weighed to calculate a weight loss. The weight loss was divided by the surface area (except for edges) of the test specimen to give a coating mass of carbon ($\mu g/cm^2$).

[Adhesion Evaluation]

Figure 3:
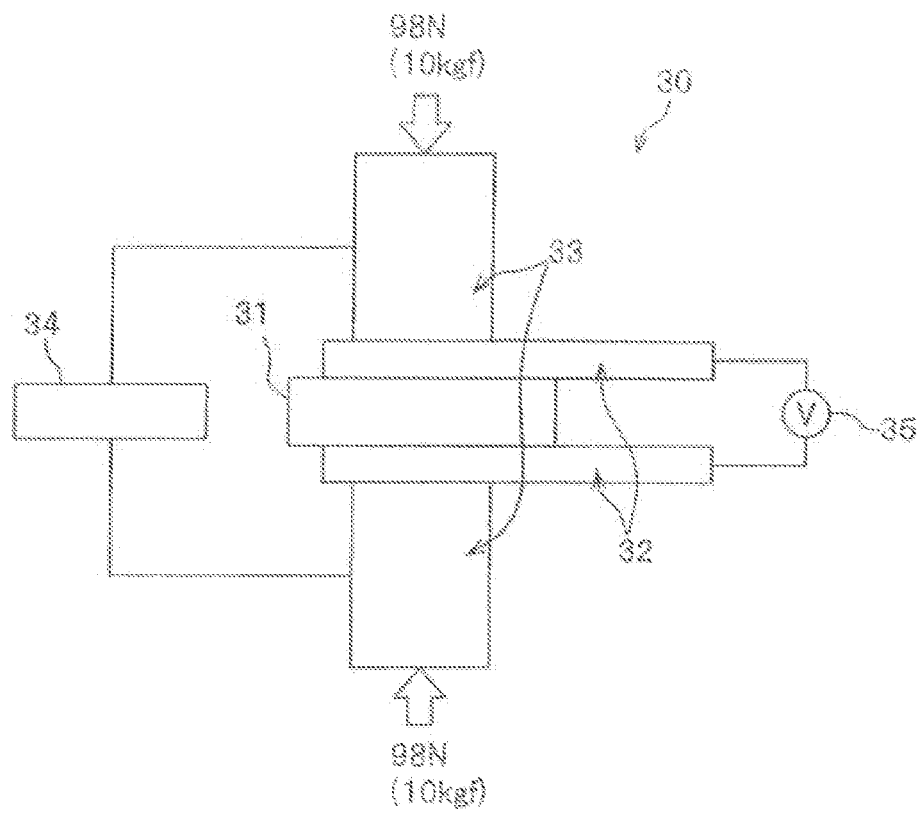
FIG. 3 depicts a schematic diagram of a contact resistance measuring instrument for use in the measurement of contact resistance and the evaluation of adhesion in working examples.

Adhesion evaluation was performed with a contact resistance measuring instrument 30 illustrated in FIG. 3. Initially, a specimen 31 was sandwiched between two carbon cloths 32 and 32, outer sides of which were further sandwiched between two copper electrodes 33 and 33 each having a contact area of 1 $cm^2$, and the specimen was pressurized from both sides each with a load of 98 N (10 kgf). While being pressurized from both sides, the specimen 31 was pulled out in an in-plane direction (pull-out test).

A non-frictional surface and a frictional surface of the specimen after the pull-out test were observed with a scanning electron microscope with energy dispersive x-ray analysis (SEM/EDX) at a 100-fold magnification to quantitatively analyze titanium (Ti) and carbon (C) at an accelerating voltage of 15 kV. The carbon layer adhesion was judged in the following manner. A specimen having a carbon amount (atomic percent) of the frictional surface of 80% or more was judged as having very good adhesion (○); a specimen having a carbon amount of the frictional surface of 50% or more and less than 80% was judged as having good adhesion (Δ); and a specimen having a carbon amount of the frictional surface of less than 50% was judged as having poor adhesion (x), each relative to the carbon amount (100%) of the non-frictional surface.

[Contact Resistance Measurement]

The contact resistance of each of the above-prepared specimens was measured with a contact resistance measuring instrument 30 illustrated in FIG. 3. Initially, a specimen 31 was sandwiched between two carbon cloths 32 and 32, outer sides of which were further sandwiched between copper electrodes 33 and 33 each having a contact area of 1 $cm^2$, and the specimen was pressurized from both sides each with a load of 98 N (10 kgf). Next, a current of 7.4 mA was applied through the copper electrodes 33 and 33 using a direct-current power source 34, and a voltage applied between the carbon cloths 32 and 32 was measured with a voltmeter 35 to calculate the contact resistance.

A specimen having a contact resistance of 10 $m\Omega \cdot cm^2$ or less was judged as having good conductivity, whereas a specimen having a contact resistance of more than 10 $m\Omega \cdot cm^2$ was judged as having poor conductivity.

[Durability Evaluation]

Each of the above-prepared specimens was subjected to a durability evaluation (durability test). Initially, a specimen was immersed in an aqueous sulfuric acid solution (10 mmol/L) having a solution volume to specimen area ratio of 20 ml/$cm^2$ at 80° C. The immersion treatment was continued for 200 hours while applying a potential of +600 mV (with reference to a saturated calomel electrode (SCE)) to the specimen. After the immersion, the specimen was retrieved from the aqueous sulfuric acid solution, washed, dried, and the contact resistance thereof was measured by the above procedure.

A specimen having a contact resistance after immersion (after durability test) (i.e., contact resistance after durability test) of 30 $m\Omega \cdot cm^2$ or less was judged as having good durability, whereas a specimen having a contact resistance after immersion test of more than 30 $m\Omega \cdot cm^2$ was judged as having poor durability.

Table 1 indicates preparation conditions for respective specimen, types of the intermediate layer, and measurement results on average grain size of titanium carbide (TiC), coating mass of carbon, carbon layer adhesion, initial contact resistance, and contact resistance after corrosion test. The "rolling reduction (%)" in Table 1 refers to a total rolling reduction (%) and is a value calculated from a change in thickness of the titanium substrate 1 between before and after cold rolling.

TABLE 1

| Specimen number | Preparation conditions | | | Average grain size of TiC (nm) | Coating mass of carbon ($\mu g/cm^2$) | Carbon layer adhesion | Initial contact resistance ($m\Omega \cdot cm^2$) | Contact resistance after durability test ($m\Omega \cdot cm^2$) | Remarks |
| | Rolling reduction (%) | Heat treatment | Intermediate layer | | | | | | |
| --- | --- | --- | --- | --- | --- | --- | --- | --- | --- |
| 1 | 75 | 700° C. for 5 min | TiC | 42 | 105 | ○ | 2.8 | 3.2 | Example |
| 2 | 30 | 600° C. for 5 min | TiC | 25 | 250 | ○ | 3.2 | 6.9 | Example |
| 3 | 3 | 650° C. for 10 min | TiC | 28 | 460 | Δ | 3 | 9 | Example |
| 4 | 2 | 700° C. for 10 min | TiC | 70 | 520 | Δ | 3.1 | 9.2 | Example |
| 5 | 75 | 400° C. for 10 min | TiC | 8 | 46 | Δ | 4.3 | 6.4 | Example |
| 6 | 50 | not performed | titanium oxide film | — | 22 | x | 8.9 | 90.8 | Comparative Example |
| 7 | 60 | 150° C. for 30 min | titanium oxide film | — | 150 | x | 7.6 | 47.5 | Comparative Example |
| 8 | 35 | 200° C. for 30 min | titanium oxide film | — | 15 | x | 6.1 | 54 | Comparative Example |

Specimens Nos. 1 to 5 each included a carbon layer satisfying conditions specified in the present invention and were found to have good adhesion of the carbon layer, a low initial contact resistance, and a good contact resistance after the corrosion test within the acceptable range.

By contrast, Specimens Nos. 6 to 8 included a titanium oxide film as an intermediate layer and were found to have poor adhesion of the carbon layer and an increased contact resistance after corrosion resistance test and to be undesirable as fuel cell separator materials.

The results in Table 1 demonstrate that the formation of an intermediate layer containing titanium carbide helps the resulting separator to be improved in adhesion between the substrate and the carbon layer, conductivity, and durability.

While the present invention has been described in detail with reference to the specific embodiments and examples thereof, it is obvious to those skilled in the art that various changes and modifications can be made in the invention without departing from the spirit and scope of the invention as hereinafter claimed. The present application is based on Japanese Patent Application No. 2010-163404 filed on Jul. 20, 2010, the entire contents of which are incorporated herein by reference.

REFERENCE SIGNS LIST

1 substrate
2 carbon layer
3 intermediate layer
3a titanium carbide
10 titanium fuel cell separator (separator)
30 contact resistance measuring instrument
31 specimen
32 carbon cloth
33 copper electrode
34 direct-current power source
35 voltmeter

The invention claimed is:

1. A titanium fuel cell separator, comprising:
a substrate consisting essentially of pure titanium or a titanium alloy;
a carbon layer formed on a surface of the substrate; and
an intermediate TiC layer formed by the reaction between titanium or a titanium alloy and a carbon layer at an interface between the substrate and the carbon layer,
wherein the intermediate TiC layer is not in the form of a film but consists essentially of titanium carbide in a form of grains ranging in a direction parallel to the carbon layer,
wherein the carbon layer is present in a mass of coating of from 2 µg/cm$^2$ to 1000 µg/cm$^2$,
wherein the titanium carbide grains have irregular sizes and an average size of from 5 nm to less than 100 nm, and
wherein the interface between the intermediate TiC layer and the carbon layer is uneven.

2. The titanium fuel cell separator of claim 1, wherein the measured contact resistance is 10 mΩ·cm$^2$ or less and the contact resistance after immersion in aqueous sulfuric acid (10 mmol/L) for 200 hours is 30 mΩ·cm$^2$ or less.

3. The titanium fuel cell separator of claim 1, wherein the titanium carbide grains have an average size of from 5 nm to 70 nm.

4. The titanium fuel cell separator of claim 1, wherein the titanium carbide grains have an average size of from 8 nm to 70 nm.

* * * * *